Nov. 16, 1971 J. N. DODGEN ET AL 3,620,154
LIVESTOCK FEED PROCESSING APPARATUS
Filed June 3, 1969 9 Sheets-Sheet 1

INVENTORS
JOHN N. DODGEN
PAUL C. SWIGGER
BY
Zarley, McKee & Thomte
ATTORNEYS

INVENTORS
JOHN N. DODGEN
PAUL C. SWIGGER
BY
Zarley, McKee & Thomte
ATTORNEYS

INVENTORS
JOHN N. DODGEN
PAUL C. SWIGGER
BY
Zarley, McKee & Thomte
ATTORNEYS

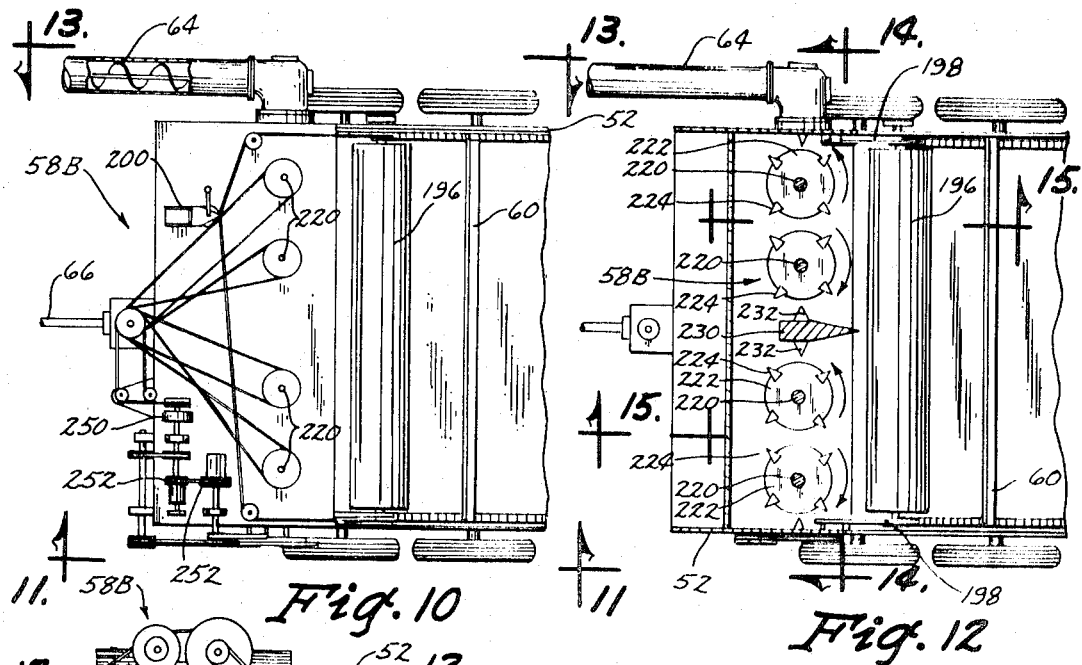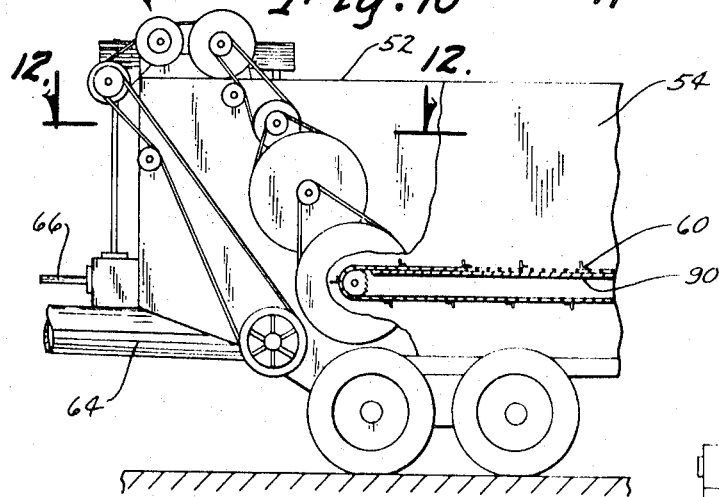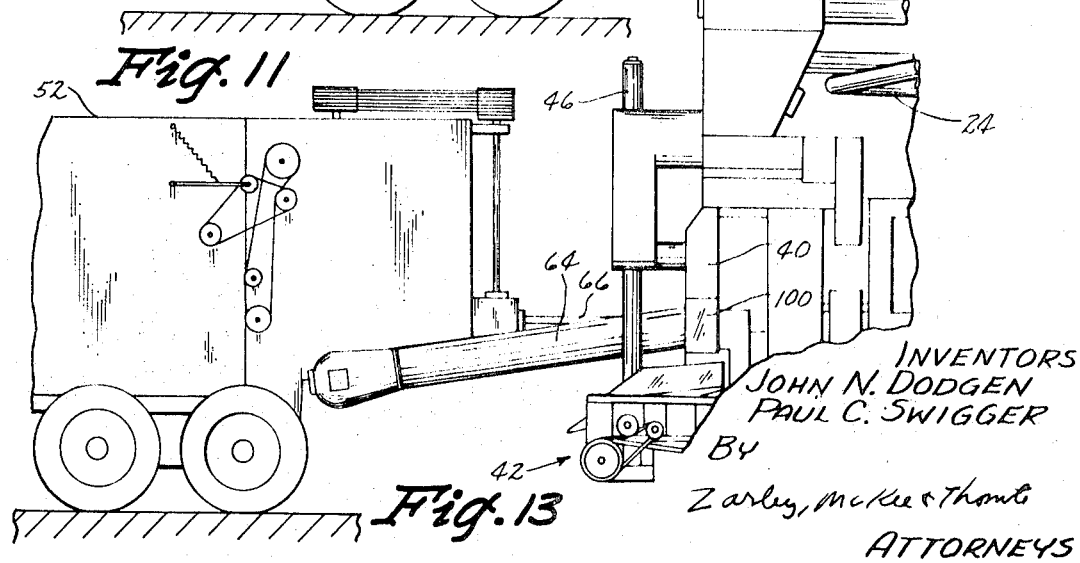

Nov. 16, 1971   J. N. DODGEN ETAL   3,620,154
LIVESTOCK FEED PROCESSING APPARATUS

Filed June 3, 1969 9 Sheets-Sheet 5

INVENTORS
JOHN N. DODGEN
PAUL C. SWIGGER
BY
Zarley, Mckee & Thomte
ATTORNEYS

Nov. 16, 1971  J. N. DODGEN ETAL  3,620,154
LIVESTOCK FEED PROCESSING APPARATUS
Filed June 5, 1969  9 Sheets-Sheet 6

INVENTORS
JOHN N. DODGEN
PAUL C. SWIGGER
BY
Zarley, McKee & Thomte
ATTORNEYS

INVENTORS
JOHN N. DODGEN
PAUL C. SWIGGER
BY
Zarley, Mckee & Thomte
ATTORNEYS

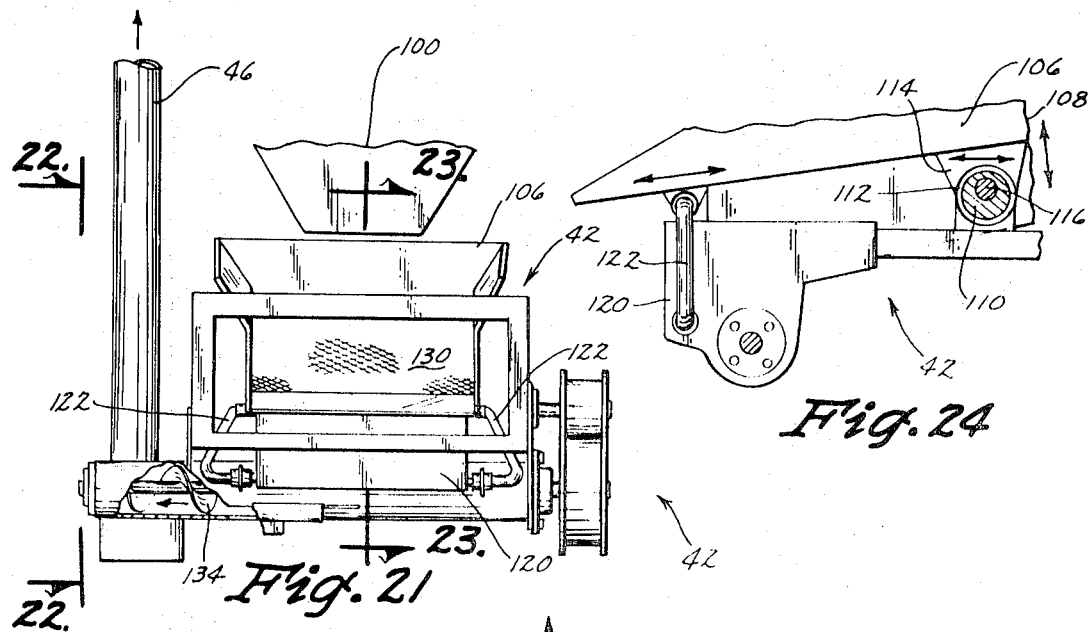
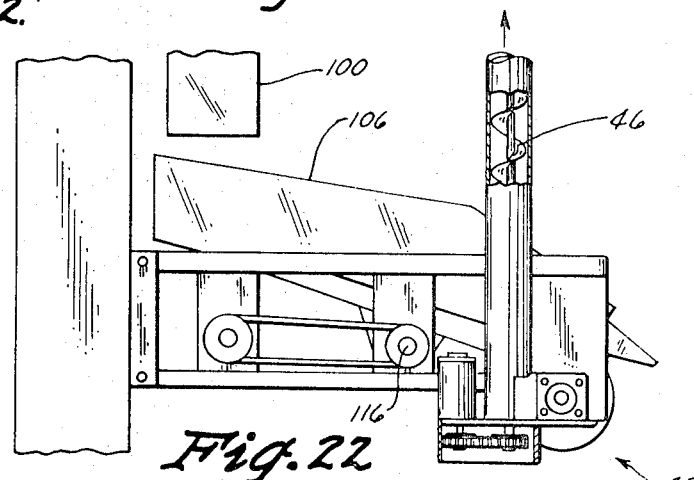
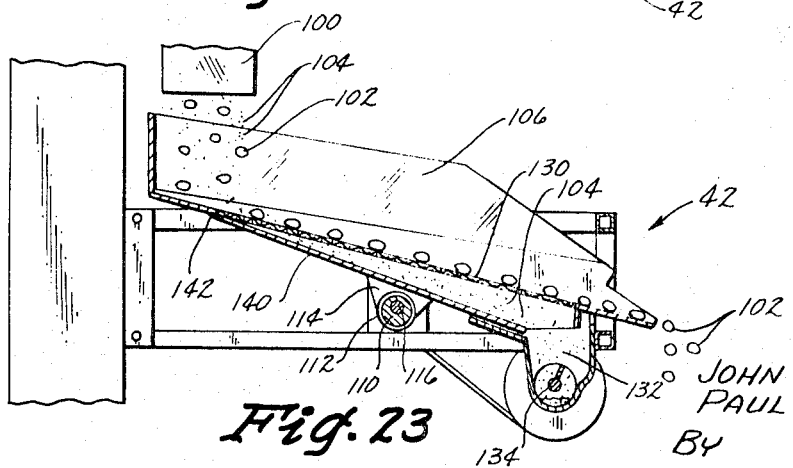

Nov. 16, 1971   J. N. DODGEN ETAL   3,620,154
LIVESTOCK FEED PROCESSING APPARATUS
Filed June 3, 1969   9 Sheets-Sheet 9
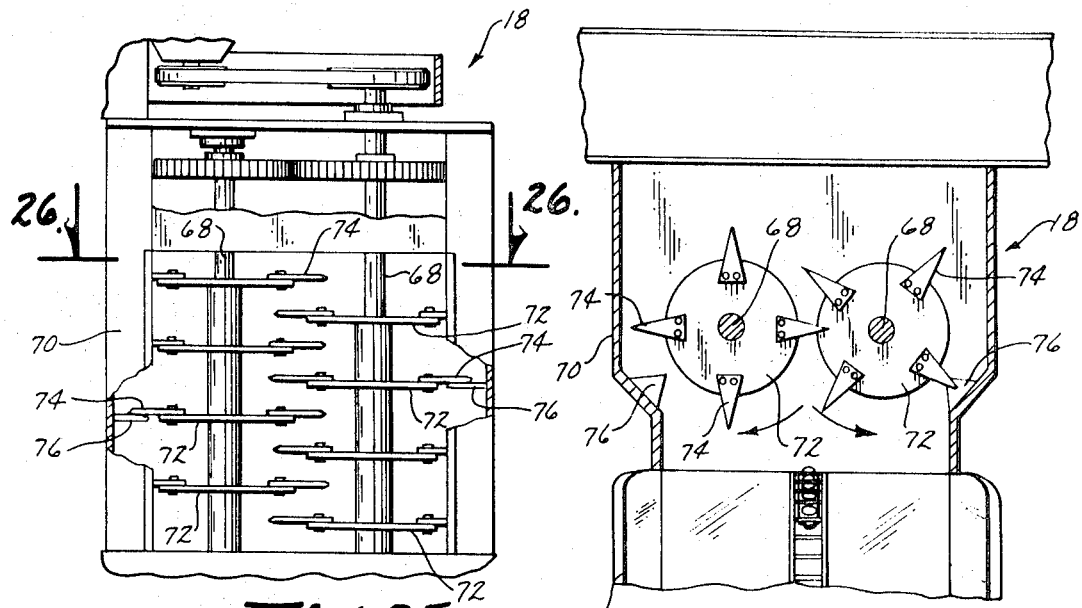
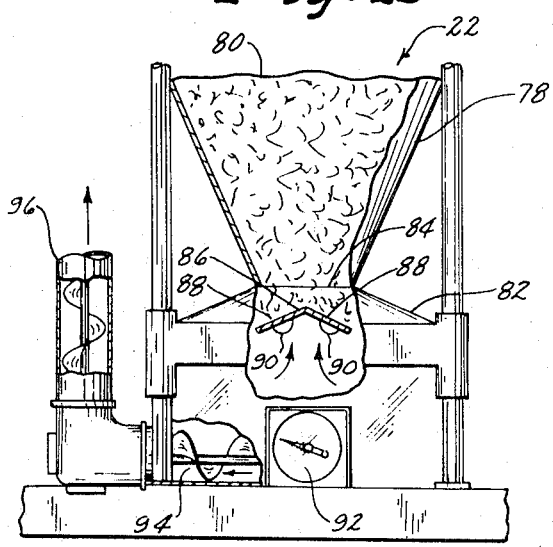
INVENTORS
JOHN N. DODGEN
PAUL C. SWIGGER
BY
Zarley, McKee & Thomte
ATTORNEYS United States Patent Office 3,620,154
Patented Nov. 16, 1971

3,620,154
LIVESTOCK FEED PROCESSING APPARATUS
John N. Dodgen and Paul C. Swigger, Humboldt, Iowa, assignors to Dodgen Industries, Inc., Humboldt, Iowa
Filed June 3, 1969, Ser. No. 830,014
Int. Cl. A23k 1/20
U.S. Cl. 99—235
14 Claims

ABSTRACT OF THE DISCLOSURE

Apparatus for processing animal feed involving a chopper unit in a wagon being fed hay by a conveyor wherein the hay is under compression from a powered roller coordinated in its speed with the speed of the chopper unit. The chopper unit involves one or more rotatable units having blades around its periphery which cooperate with stationary blades in cutting the feed material. One or more pairs of chopper rollers may be provided which turn towards the chopper unit inlet and cooperate with adjacent stationary blades. The material from the wagon may be fed from the chopper unit directly into an apparatus for producing livestock feed pellets having a hammer mill or the like. The chopper unit may also be placed on the machine for producing the pellets. The ground feed prior to being pelletized may be screened by a baffle plate having magnets associated with it for extracting metallic foreign material in the feed. The pellets produced by the pelletizer unit may be sorted by eccentrically operated shaker to separate out the fines. The forward lower end of the shaker being pivotally connected to the frame while the rear raised end is connected to the powered eccentric and may move in random directions.

---

The livestock feed processing apparatus of this invention is an improvement on applicants' machine disclosed in Pat. No. 3,288,051 which issued Nov. 29, 1966. The details of structure not covered in this application are more fully covered in this patent and applicants' earlier Pat. No. 3,065,808 issued Nov. 27, 1962. This patent discloses the apparatus for weighing the feed within the mixing bin.

The problem that this apparatus collectively is attempting to solve is the one of simplifying the production of the end feed product for livestock. The use of the chopper unit in the wagon and/or on the pelletizer truck results in a much finer grind material being fed through the processing system particularly when the raw material is baled hay or the like. This apparatus contemplates feeding the baled hay or the like directly into the pelletizer truck or through the chopper unit on a wagon and then through an auger tube into the processing system of the pelletizer truck.

The problem of foreign material in the feed product while being processed has been minimized by the inclusion of a baffle unit having magnetic means for removing metallic foreign material.

The end product i.e. the pellets are more economically produced since the fines are separated out and saved and returned to the pellet making unit by a unique shaker assembly.

In one embodiment of the chopper unit there are a plurality of vanes around the periphery of the drum and they are pivotally connected thereto and may all be removed simultaneously by the removal of a single pin. These blades have a unique cutting end and cooperate with a perforated screen positioned closely adjacent thereto to screen the ground product.

These and other features and advantages of this invention will become readily apparent to those skilled in the art upon reference to the following description when taken into consideration with the accompanying drawings, wherein:

FIG. 10 is a top plan view of the rear end of the wagon having the vertically arranged chopper unit;

FIG. 11 is a side elevation view taken along 11—11 in FIG. 10;

FIG. 12 is a cross-sectional view of the unit of FIG. 10 taken along line 12—12 in FIG. 11;

FIG. 13 is a side elevation view taken along line 13—13 in FIG. 10 and showing the wagon having a vertical chopper unit interconnected by power means and discharge auger means to the pelletizer truck;

FIG. 21 is an end elevation view of the shaker unit taken along line 21—21 in FIG. 20;

FIG. 22 is a side elevational view of the shaker unit taken along line 21—21 in FIG. 20;

FIG. 22 is a side elevational view of the shaker unit taken along line 22—22 in FIG. 21;

FIG. 23 is a cross-sectional view through the shaker unit taken along line 23—23 in FIG. 21;

FIG. 24 is a fragmentary side elevation view of the shaker unit shown alone;

FIG. 25 is a cross-sectional view taken along line 25—25 in FIG. 18 showing the vertical chopper unit on the pellet truck;

FIG. 26 is a cross-sectional view taken along line 26—26 in FIG. 25; and

FIG. 27 is a fragmentary elevation view of the dust remover chamber and the collector thereunder associated with scales and having a baffle unit mounted therein with magnets for removing foreign metallic material.

Figure 1:
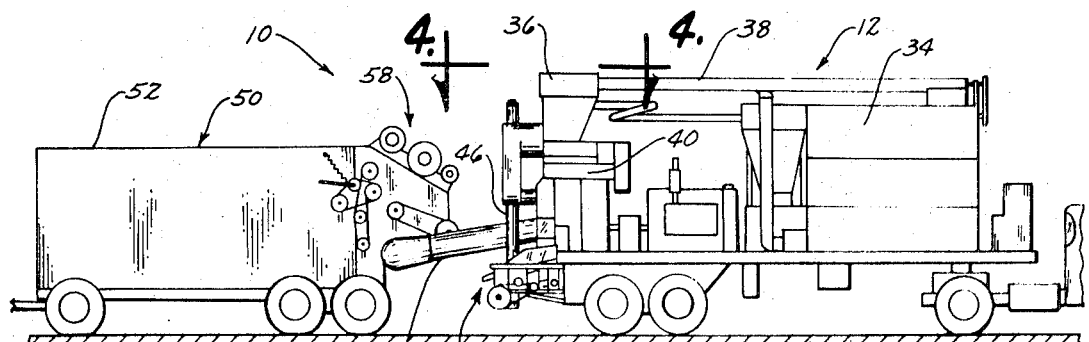
FIG. 1 is a side elevation view of the chopper wagon feeding material into the pelletizer truck.
Figure 17:
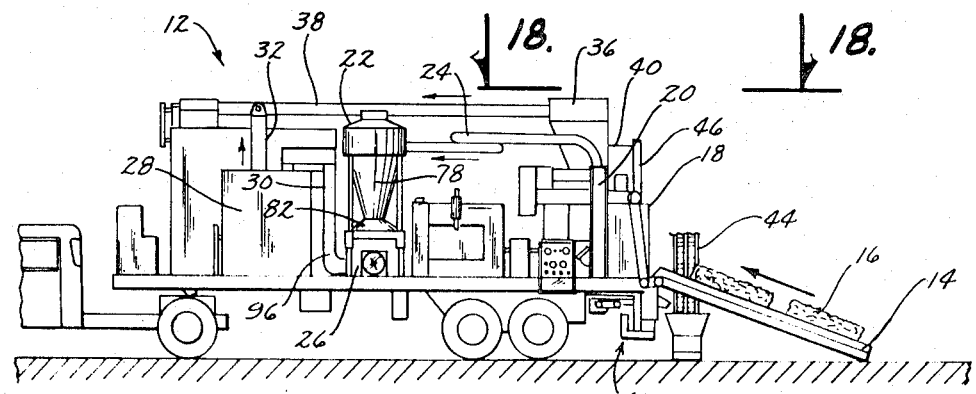
FIG. 17 is a side elevation view of the pellet truck having a chopper unit for the baled hay preceding the hammer mill.
Figures 18, 19:
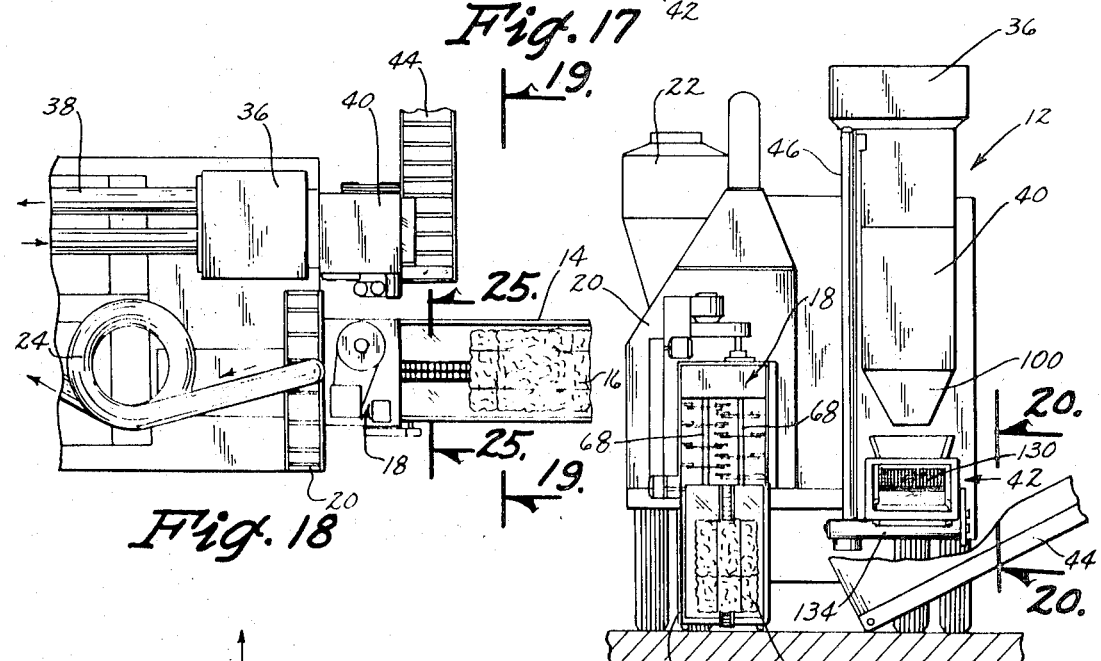
FIG. 18 is a fragmentary top plan view of the pellet truck taken along line 18—18 in FIG. 17.
FIG. 19 is an end elevation view of the pellet truck taken along line 19—19 in FIG. 18.

The livestock feeding processing apparatus of this invention is referred to generally in FIG. 1 by the reference numeral 10 and includes the pellet truck 12 which is described in detail in applicants' previously referred to Patent No. 3,288,051. Referring to FIGS. 1, 17, 18 and 19 it is seen that the pellet truck includes a bale conveyor 14 for bales 16 to be fed into a vertical chopper unit 18 in communication with a hammer mill 20 which in turn feeds a dust remover unit 22 through a spiral conduit 24. From the dust remover unit 22 which includes a scales unit 26 the feed material is fed to a mixing bin 28 through an auger 30 and then is transmitted by an auger 32 to a holding unit 34 (FIG. 1) where it is then transmitted to a molasses mixing hopper 36, the overflow from this hopper being returned by the auger 38 to the holding unit 34. From the mixing hopper 36 the material is fed into the pellet machine 40 from which it is discharged into a shaker 42 which transmits it to a conveyor 44 (FIGS. 17 and 19). The fines separated out from the pellets are returned by an auger 46 to the pellet making unit 40.

Figure 2:
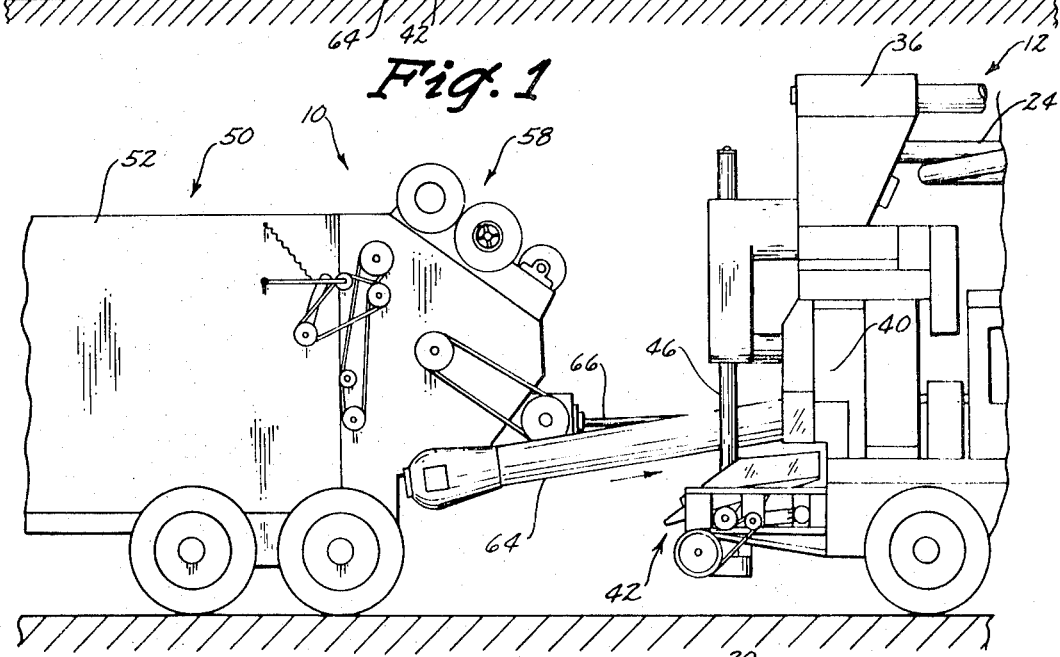
FIG. 2 is an enlarged fragmentary view of the adjacent ends of the wagon and the truck being interconnected by a power means and the discharge auger of the wagon being connected to the intake of the pellet truck.
Figure 3:
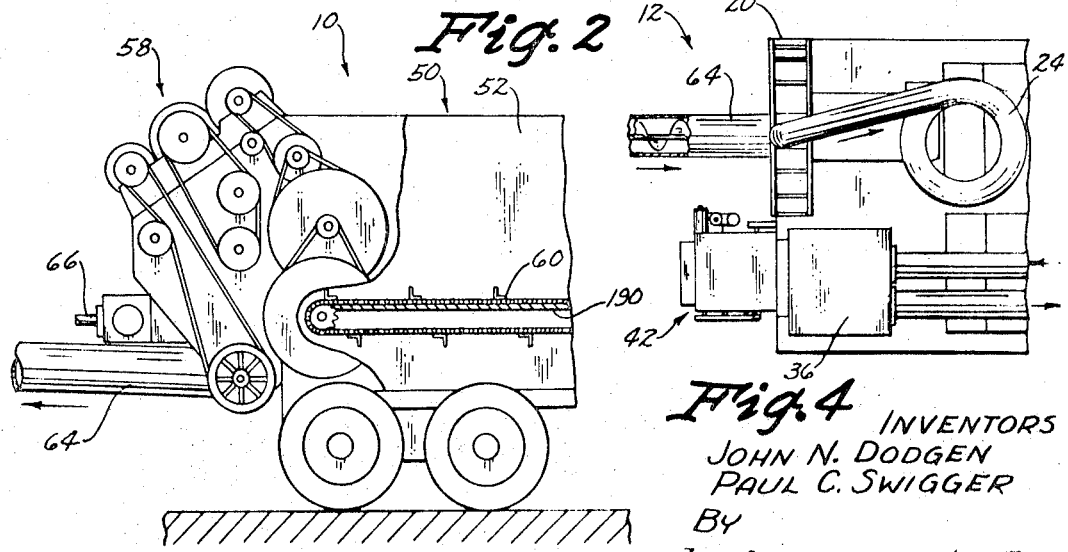
FIG. 3 is a fragmentary side elevation view of the right rear side of the wagon.
Figure 4:
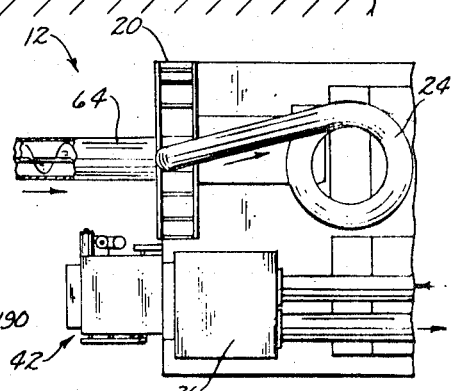
FIG. 4 is a fragmentary top plan view of the rear end of the truck taken along line 4—4 in FIG. 1.
Figure 5:
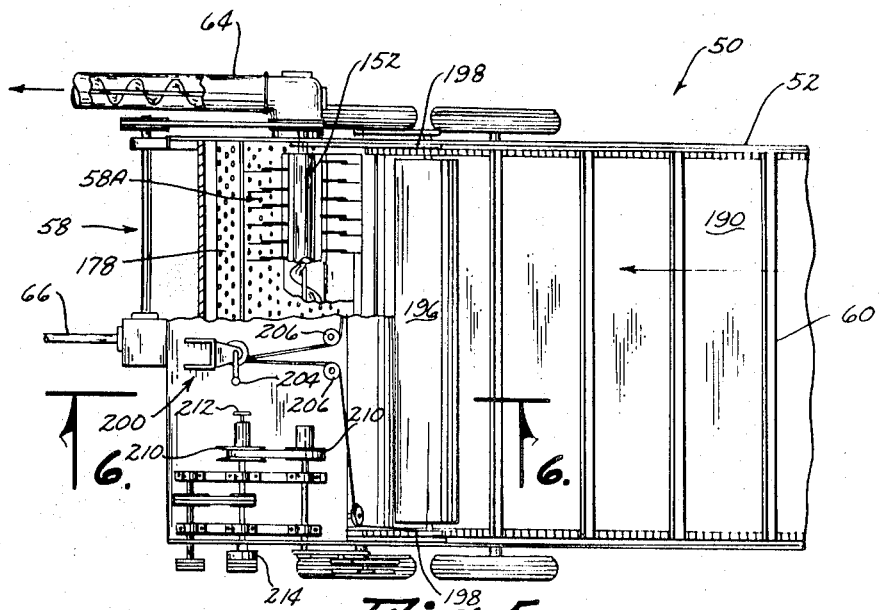
FIG. 5 is a fragmentary top plan view of the rear end of the wagon.
Figure 6:
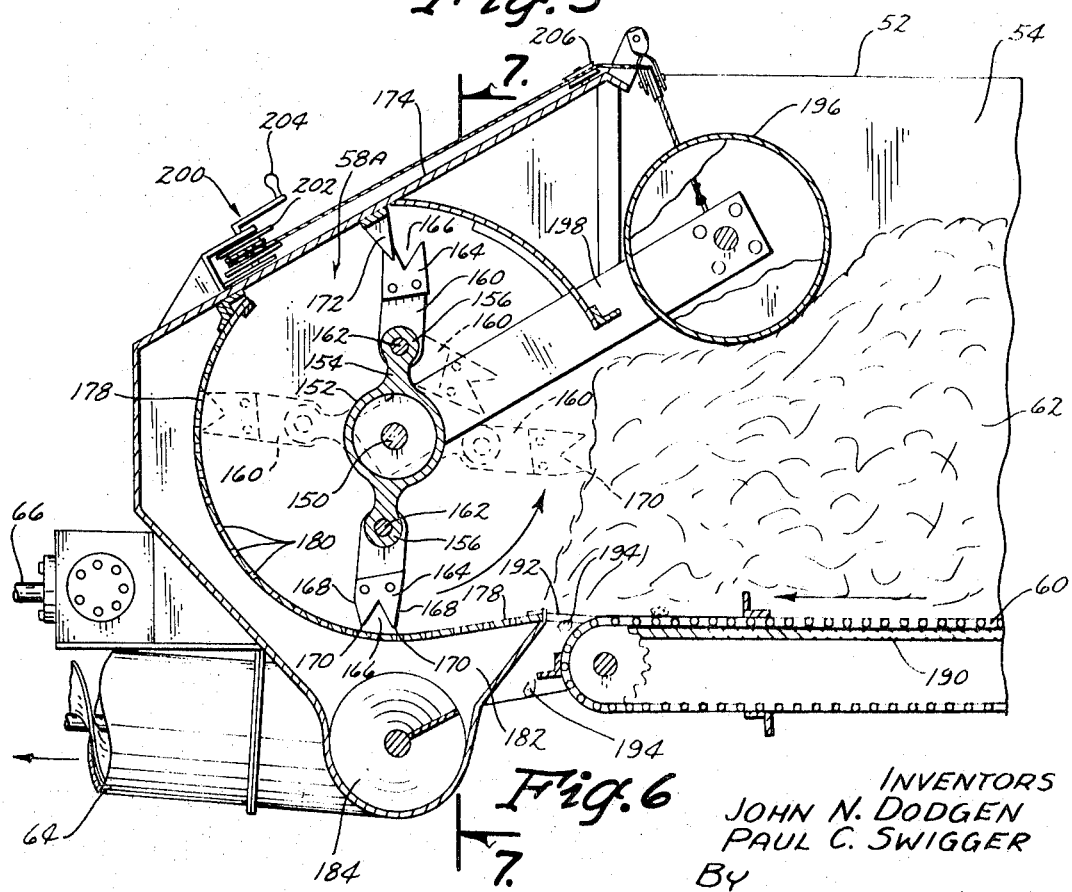
FIG. 6 is a cross-sectional view taken along line 6—6 in FIG. 5 showing the horizontal chopper unit and the hold-down powered roller.
Figure 7:
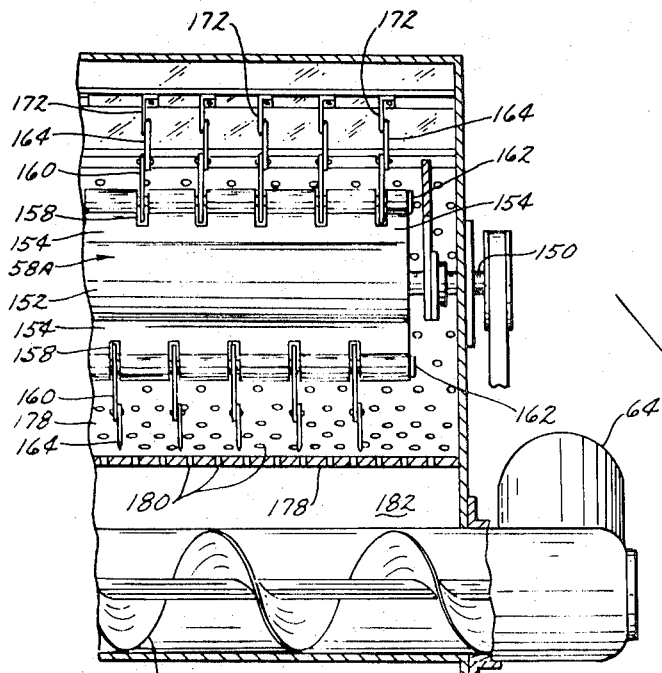
FIG. 7 is a cross-sectional view taken along line 7—7 in FIG. 6.

As seen in FIG. 1, the pellet truck may be fed material from a wagon 50 having a box 52 and a chamber therein 54 (FIG. 6). A chopper unit 58 is located at the rear of the wagon and is fed by a conveyor 60 (FIG. 6) and after the product 62 in the chamber 54 is ground by the chopper unit 58 it is discharged by an auger 64 which is in communication with the hammer mill 20. The operative parts of the wagon 50 are driven through a drive shaft 66 extending from the pellet truck 12 to the wagon 50 (FIG. 2).

The chopper unit 18 on the rear of the pellet truck as seen in FIG. 19 includes a pair of vertically disposed rotatable shafts 68 positioned within a housing 70 (FIG. 26). A series of circular disks 72 are spaced along the length of each of the shafts and are alternated with the adjacent disk on the adjacent shaft such that they are in overlapping relationship. Outwardly pointed V-shaped cutting blades 74 are fixedly secured to the outer peripheral edges of each of the disks 72 and pass closely adjacent to a triangular-shaped stationary cutting blade 76 mounted in the inside of the housing wall 70. The pair of shafts rotate in opposite directions as seen in FIG. 26 such that the product being cut is forced outwardly against the stationary cutting blade 76 as it enters the chopping unit 18. It is noted that no screen is necessary behind the chopper unit 18 as the product is sufficiently ground as it passes therethrough.

Referring now to the dust remover unit 22 best shown in FIG. 27, it is seen that it includes a downwardly extending funnel-shaped housing 78 which funnels material 80 into a collector chamber 82 which flares outwardly and is enlarged relative to the outlet 84 of the dust remover casing or housing 78. A downwardly opening V-shaped baffle plate unit 86 is disposed adjacent the bottom of the funnel casing 78 and in the collector chamber 82. The baffle unit 86 has a pair of wings 88 which have an effective length substantially equal to the diameter of the funnel outlet 84. The baffle construction permits the product 80 to flow into the collector chamber 82 but prevents dust from going back up into the funnel 78. Additionally, magnet elements 90 are placed on the bottom sides of the wing elements 88 and thus attract foreign matter which is metallic in nature as indicated by the arrows in FIG. 27. Accordingly, dust and foreign metallic matter is removed from the product 80 as it passes through the unit 22. Additionally, the product 80 as it is collected in the chamber 82 is weighed by scales 92 before it is augered therefrom by the auger 94 which is in communication with an upstanding auger 96 which is as indicated previously, in communication with the mixing bin 28.

Figure 20:
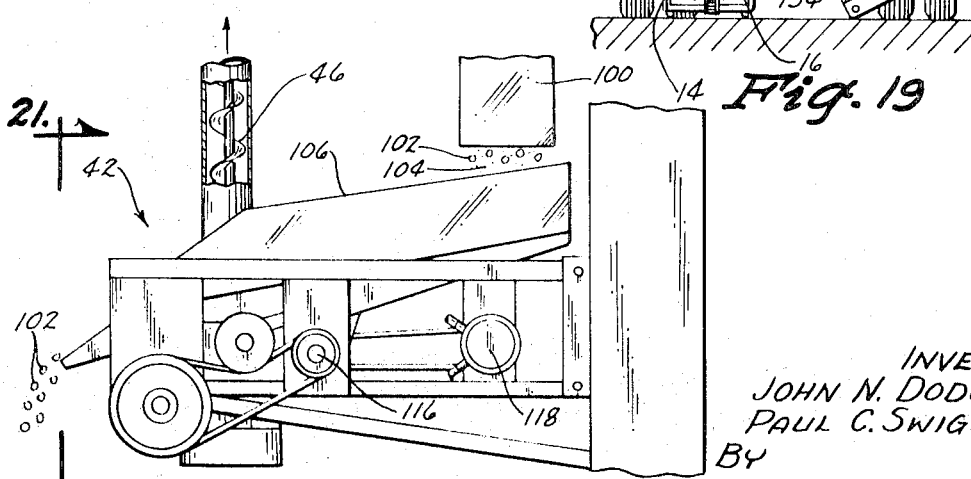
FIG. 20 is a cross-sectional view taken along line 20—20 in FIG. 19 and showing the pellet shaker unit discharging pellets from the pellet truck.

The final step in the process is performed by the shaker 42 which is best illustrated in FIGS. 20–24. It is seen in FIG. 23 that a chute 100 drops the pellets 102 along with feed fines 104 into a trough 106. The trough 106 is carried at its upper end 108 as seen in FIG. 24 on an eccentric cam 110 which rotates in a race 112 on a trough mounting bracket 114. A shaft 116 extends through the eccentric 110 and is driven by a hydraulic motor 118 (FIG. 20). The lower end of the trough 106 is pivotally connected to the frame portion 120 by a pair of rocker support arms 122 having inwardly extending end portions for pivotally engaging the frame 120 and the trough 106. Thus it is seen that upon rotation of the shaft 116 the upper end will move erratically up and down and horizontally as indicated by the arrows while the lower end will move more or less along an arcuate path and more horizontally.

The trough 106 has a bottom wall 130 which is perforated to permit the feed fines 104 to filter therethrough into an auger chamber 132 for return by the augers 134 and 46 to the pellet making machine apparatus 40 as seen in FIG. 19. It is also seen in FIG. 23 that a guide bottom wall 140 is rigidly secured secured by weld or the like 142 to the perforated trough bottom wall 130 and guides the feed fines 104 downwardly into the auger channel 132.

It is thus seen that through the use of this shaker assembly 42 that the relatively extreme agitation of the trough 106 at its upper end adjacent the product being deposited therein causes the feed fines 104 to quickly filter through the bottom wall 130 of the trough 106 before they can be ejected along with the pellets 102 as seen in FIG. 23. The lower end of the trough is agitated to a relatively smaller degree and thus limits the amount of fines that drop through the trough bottom wall so close to the ejection end of the trough. The return of the feed fines to the pellet making unit permits repelleting the product without adding more molasses and feed supplements which has already been added in the proper proportions.

The wagon 50 and the details of the horizontally disposed chopper unit along with the hold-down roller are best shown in FIGS. 1–9. The horizontally rotatable chopper unit is referred to throughout generally by the reference numeral 58A and includes a drive shaft 150 rigidly connected to a sleeve 152 having diametrically oppositely extending vanes 154 with a series of sleeve elements 156 formed along their outer edge (FIG. 6). Between each pair of adjacent sleeves 156 a slot 158 is formed to receive the inner end of a cutting blade plate element 160 which is pivotally carried on a shaft 162 extending through each of the sleeves 156 in alignment with each other. The outer ends of the blades 160 have blade portions 164 formed with outwardly opening V-shaped notches 166. The side edges of the notch 166 merge with outer side edges 168 of the blade 164 to form outwardly projecting pointed ends 170.

A series of inwardly projecting triangular-shaped stationary blades 172 are provided on the top wall 174 of the chopper housing and are positioned closely adjacent to and in overlapping relationship with the blades 164 as they are rotated. It is also seen that the blades 160 may freely pivot on the shafts 162 to the dash line positions shown in FIG. 6 and thus effect better cutting action with the stationary blades 172. A generally semicylindrical screen 178 having openings 180 formed therein extends around the rear and bottom side of the chopper as seen in FIG. 6. The chopped material passes through the openings 180 into an auger trough 182 for discharge by the transverse auger 184 to the longitudinally extending auger 64 which is adapted to be placed in communication with the hammer mill 20 on the pellet truck as seen for example in FIG. 4.

The chamber 54 of the wagon box 52 containing the hay material 62 and the conveyor 60 on the bottom wall 190 provides storage for the material 62 being fed into the chopper 58A. A clearance opening 192 is provided at the forward end of the conveyor 60 adjacent the rear end of the screen 178 to permit discharge of solid elements 194.

Figure 9:
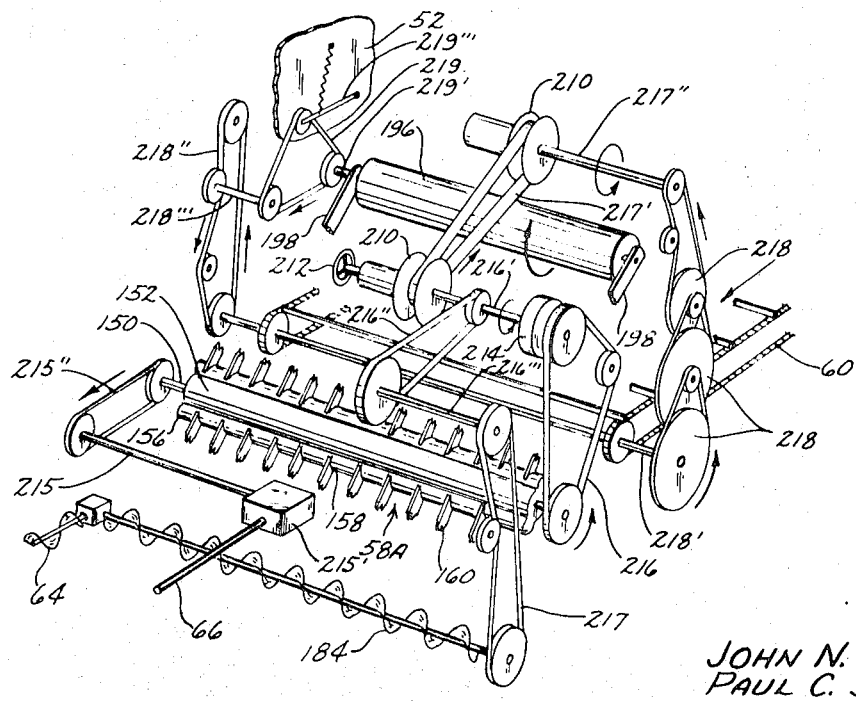
FIG. 9 is an exploded perspective of the drive arrangement employed in the wagon of FIGS. 6 and 7 employing the horizontal chopper unit.

To assist in guiding the product 62 into the chopper 58A a hold-down powdered roller 196 is provided which is carried on arms 198 at its opposite ends. The rate of rotation of the hold-down roller 196 is controlled by the drive arrangement as seen in FIG. 9 and is co-ordinated with the speed of rotation of the chopper 58A such that the desired quantity of product 62 is being worked on at all times.

Additionally, a winch 220 (FIG. 6) is provided for raising and lowering the powered hold-down roller 196 and includes a reel 202 having a handle 204, cable being wrapped around the reel and extending outwardly around sheaves 206 to the opposite ends of the hold-down roller 196. It is thus seen that the hold-down roller may be pivoted to the desired depth to regulate the height of the product 62 entering the chopper 58A.

Figure 8:
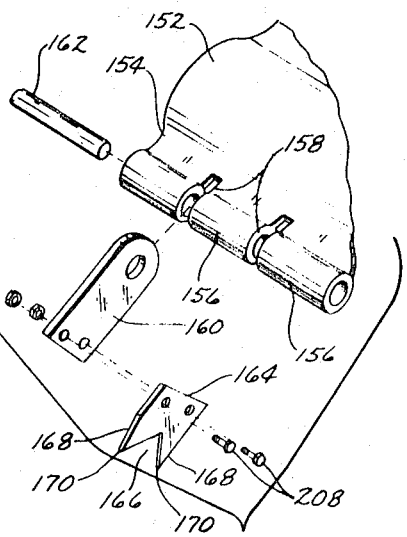
FIG. 8 is an exploded perspective view of the blade elements and their attachment to the horizontally disposed cylinder of the chopper unit illustrated in detail in FIGS. 6 and 7.

In FIG. 8 it is seen that by use of bolts 208 the blade elements 164 may be quickly removed and replaced or inverted to provide maximum cutting action. Also it is seen that the entire blade assembly may be removed by simply pulling the shaft 162 out of the sleeve elements 156. The drive arrangement is illustrated in FIG. 9 and shows that the power take-off shaft 66 connected to the pellet machine 40 when operated results in operation of the operative parts of the wagon 52 including the two augers 64 and 184, the chopper unit 58A, the conveyor 60 and the hold-down roller 196. Adjustable sheaves 210 are provided for varying the speed of the conveyor 60 and are adjustable by the hand operated handle 212.

The clutch 214 is electrically connected to a speed control (not shown) on the diesel motor of the pellet machine 40 so that if the diesel engine is overloaded and slows down, the clutch will shut off the augers 64 and 184 and the intake conveyor 60 and roller 196. This clutch is commercially available through the Stearns Electric Company, Milwaukee, Wis. and also the Synchro-Start Company, Skokie, Ill., and is illustrated in detail in Pat. No. 2,904,651.

The detailed operation of the power train of FIG. 9 is as follows: The power take-off shaft 66 driven by the pellet machine 40 drives a laterally extending shaft 215 extending from a gear box 215'. A belt 215" is connected to the center shaft 150 of the chopper unit 58A at one end and the opposite end drives a belt 216 which is connected to the electric clutch 214 on a shaft 216'. The shaft 216' serves as a power source for the augers 64 and 184 as they are driven by a belt 216" which is connected to a shaft 216''' which in turn is connected to the auger shaft 184 through a belt 217. Additionally, the shaft 216' drives the variable clutch 210 which in turn through a belt 217' drives the associated variable pulley 210 on a shaft 217". The shaft 217" is then connected through a series of reducing pulleys 218 to a shaft 218' connected to the floor conveyor 60. The opposite end of the floor conveyor shaft 218' drives a belt 218" which is connected to a drive shaft 218''' coupled to a belt 219 connected to the drive shaft 219' of the hold-down roller 196. The arm 219''' having a pulley on its outer end is spring biased to serve as a belt tightener for the belt 219.

Figure 14:
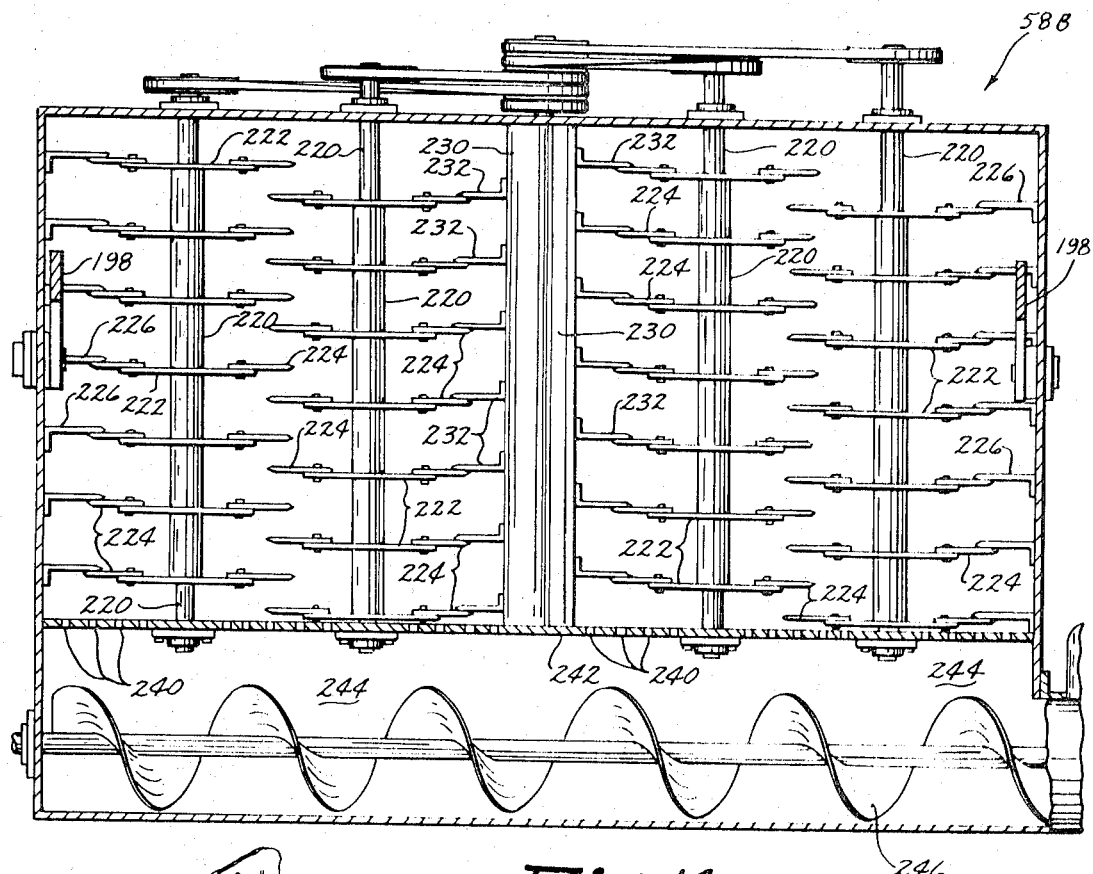
FIG. 14 is a cross-sectional view taken along line 14—14 in FIG. 12 and showing the vertically arranged chopper members.

In FIGS. 10–13 the wagon having a vertically oriented chopper unit 58B is disclosed and is similar in many respects to the chopper unit 18 (FIG. 26) on the pellet truck. Two sets of vertically disposed shafts 220 are provided across the width of the rear end of the wagon box 52. Each shaft includes a series of circular disk plates 222 having a plurality of outwardly extending triangular blades 224 which rotate on the shaft 220 closely adjacent stationary blades 226 on the side walls of the wagon 52 as seen in FIG. 14. The adjacent blades 224 on adjacent shafts 220 are staggered and in overlapping relationship as seen in FIG. 14. A divider post 230 is provided between the two sets of rotatable shafts 220 and has diametrically oppositely extending stationary blades 232 thereon for cooperation with the cutter blades 224 on the adjacent vertical shafts 220. The material chopped by the operation of the chopper unit 58B drops through openings 240 in the bottom wall 242 into an auger channel 244 having a transversely extending auger 246 in communication with the auger 64 adapted to feed material to the hammer mill on the pellet truck 12 (FIG. 13).

The powered hold-down roller 196 is carried on arms 198 in a similar manner as illustrated in the horizontal chopper unit previously discussed and is operated by a cable arrangement substantially the same except that the winch 200 is located further to one side as seen in FIG. 10 to provide clearance for the drive arrangement operating the vertical chopper units.

Figure 16:
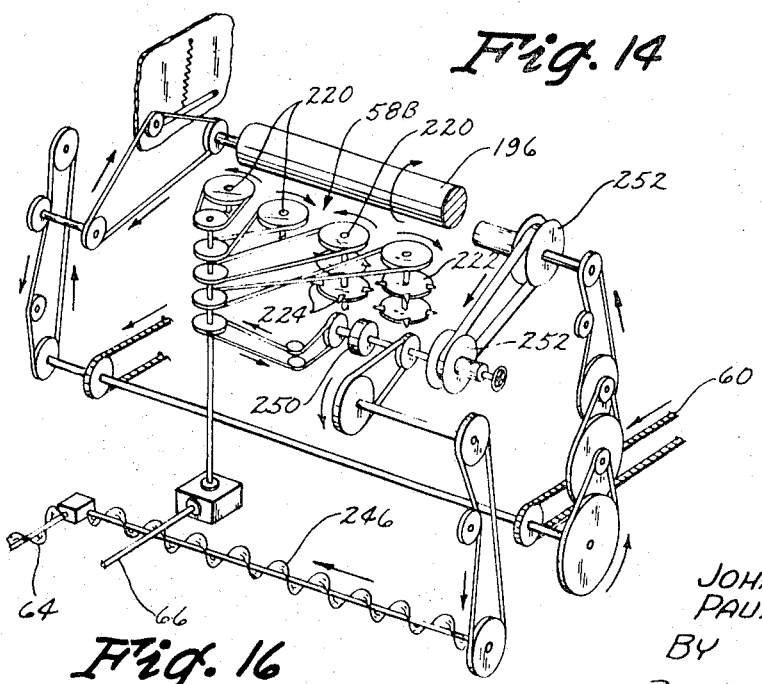
FIG. 16 is a fragmentary exploded view of the drive arrangement for operating the vertically arranged chopper members in the feed wagon.
Figure 15:
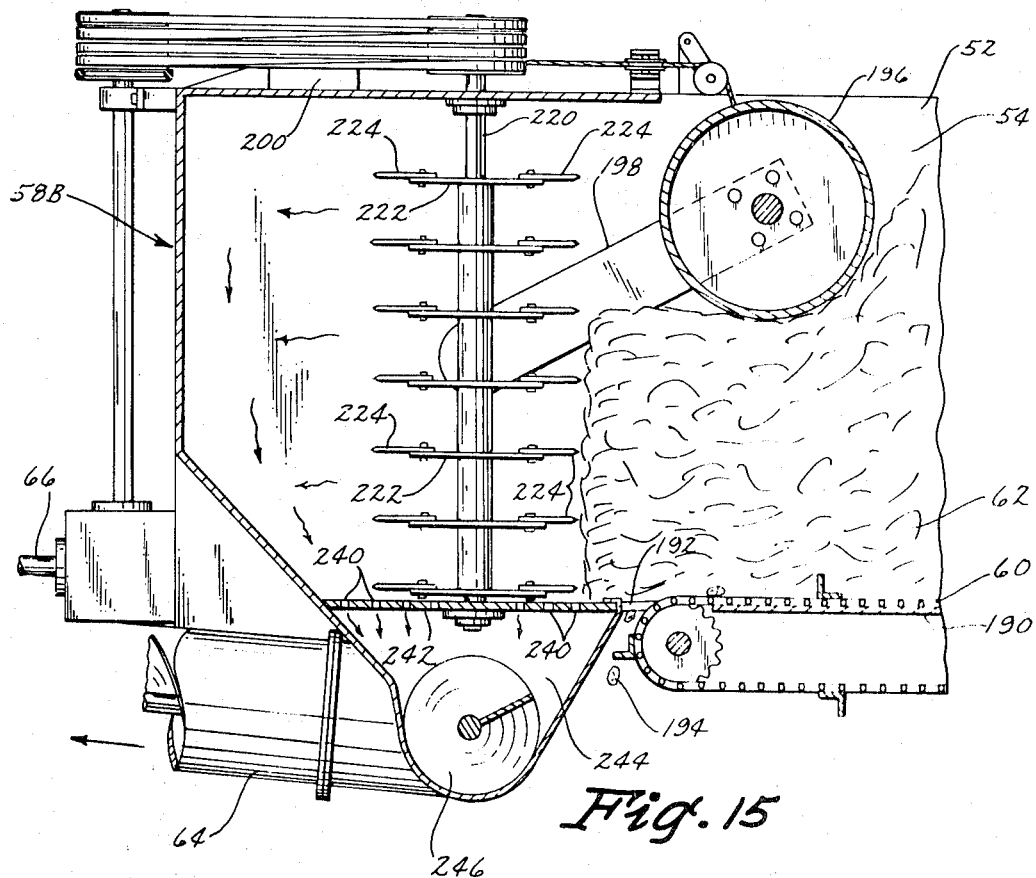
FIG. 15 is a cross-sectional view taken along line 15—15 in FIG. 12.

As seen in FIG. 16 the drive arrangement for the operative members of the wagon illustrated in FIGS. 10–16 is shown and again is similar to that shown in FIG. 9. The power take-off drive shaft 66 operates the chopper unit 58B and also through the electric clutch 250 drives the conveyor 60 and the hold-down roller 196 whereby if the chopper unit 58B is overloaded the hold-down roller 196 and the conveyor 60 will be stopped without damage occurring. Adjustable sheaves 252 are provided for varying the speed between the conveyor 60 and the hold-down roller 196 and the chopper unit 58B as desired.

Thus it is seen that the device accomplishes all of its stated objectives.

Some changes may be made in the construction and arrangement of our livestock feed processing apparatus without departing from the real spirit and purpose of our invention and it is our intention to cover by our claims, any modified forms of structure or use of mechanical equivalents which may be reasonably included within their scope.

We claim:

1. A feed processing machine comprising in combination,
a frame,
a pulverizing unit mounted on said frame and adapted to receive feed to be processed,
means mounted on said frame for receiving supplement and for mixing said supplement and said feed together,
means for transmitting the feed from said pulverizing unit to said mixing means,
means mounted on said frame for making pellets from said mixed feed,
auger means for transmitting the mixed feed from said mixing means to said pellet making means, and said means for transmitting feed from said pulverizing unit to said mixing means includes a collector unit, said collector unit having a passageway and a magnetic means disposed in said passageway to extract metallic foreign matter from said feed as it passes through said passageway.

2. The structure of claim 1 wherein a baffle unit is positioned in said passageway, said passageway having an inlet and an outlet, said magnetic means being positioned on the outlet side of said baffle unit.

3. The structure of claim 2 wherein said baffle unit includes a V-shaped baffle plate opening towards said outlet.

4. The structure of claim 3 wherein said magnetic means includes a magnetic unit on the outlet side of each leg of said baffle plate.

5. The structure of claim 4 wherein said passageway includes a funnel-shaped portion which merges with an enlarged passageway portion, and said baffle unit being positioned in said enlarged passageway portion adjacent the smaller end of said funnel portion whereby feed moving from said funnel portion is deflected outwardly by said baffle unit.

6. A feed processing machine comprising in combination,
a frame,
a pulverizing unit mounted on said frame and adapted to receive feed to be processed,
means mounted on said frame for receiving supplement and for mixing said supplement and said feed together, means for transmitting the feed from said pulverizing unit to said mixing means, means mounted on said frame for making pellets from said mixed feed, auger means for transmitting the mixed feed from said mixing means to said pellet making means, and a shaker unit is provided to receive feed from said pellet making means, said shaker unit includes an elongated trough having a support member pivotally connected at one end and pivotally connected therebelow to said frame, power means connected to the other end of said trough for imparting eccentric movement to said trough.

7. The structure of claim 6 wherein said trough is inclined downwardly from said eccentric power means to said pivotal support member.

8. The structure of claim 7 wherein said trough includes a perforated bottom wall for feed of a predetermined size to pass through while larger feed material is discharged from the lower end of said trough.

9. The structure of claim 8 wherein said support member limits trough movement at said lower end to reciprocal horizontal arcuate movement as said trough pivots about the pivotal axis of said support connection to said frame.

10. A feed processing machine comprising in combination, a frame, a chopper unit on said frame including a pair of vertically disposed rotatable chopper members positioned in side-by-side relationship, a pulverizing unit mounted on said frame and adapted to receive feed to be processed from said chopper unit, means mounted on said frame for receiving supplement and for mixing said supplement and said feed together, means for transmitting the feed from said pulverizing unit to said mixing means, means mounted on said frame for making pellets from said mixed feed, and auger means for transmitting the mixed feed from said mixing means to said pellet making means.

11. The structure of claim 10 wherein said chopper unit includes a housing around said pair of members, said housing having an inlet and an outlet opening, means for rotating said members outwardly relative to said inlet opening and inwardly relative to said outlet opening.

12. The structure of claim 11 wherein said rotatable members have a plurality of radially extending blades along their length and a plurality of stationary blades are mounted on the said housing adjacent said rotatable blades.

13. The structure of claim 12 wherein said rotatable blades and said stationary blades are in close overlapping relationship.

14. The structure of claim 13 wherein said rotatable blades on said pair of members are in overlapping relationship.

References Cited

UNITED STATES PATENTS

| | | | |
|---|---|---|---|
| 2,651,269 | 9/1953 | French | 107—4 |
| 2,772,642 | 12/1956 | Linol | 107—4 |
| 3,181,482 | 5/1965 | Heth et al. | 107—4 |
| 3,288,051 | 11/1966 | Dodgen et al. | 107—4 X |

BILLY J. WILHITE, Primary Examiner

U.S. Cl. X.R.

107—4; 209—111.8; 241—152